No. 854,453. PATENTED MAY 21, 1907.
T. BLASS, J. L. HAEHNLEN & W. W. COX.
METHOD OF PRODUCING SALTS OF VOLATILE BASES.
APPLICATION FILED JULY 14, 1906.
2 SHEETS—SHEET 1.
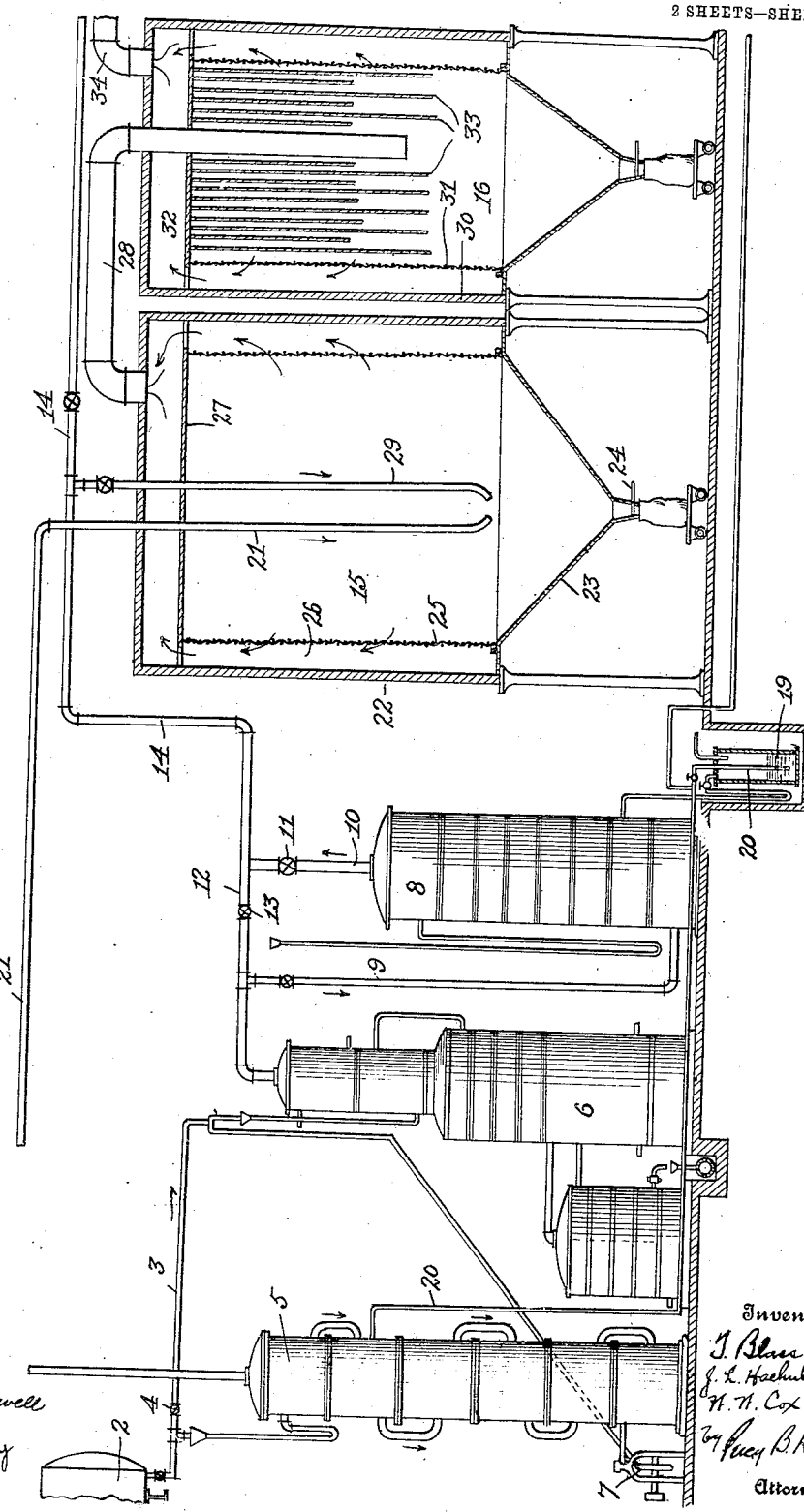

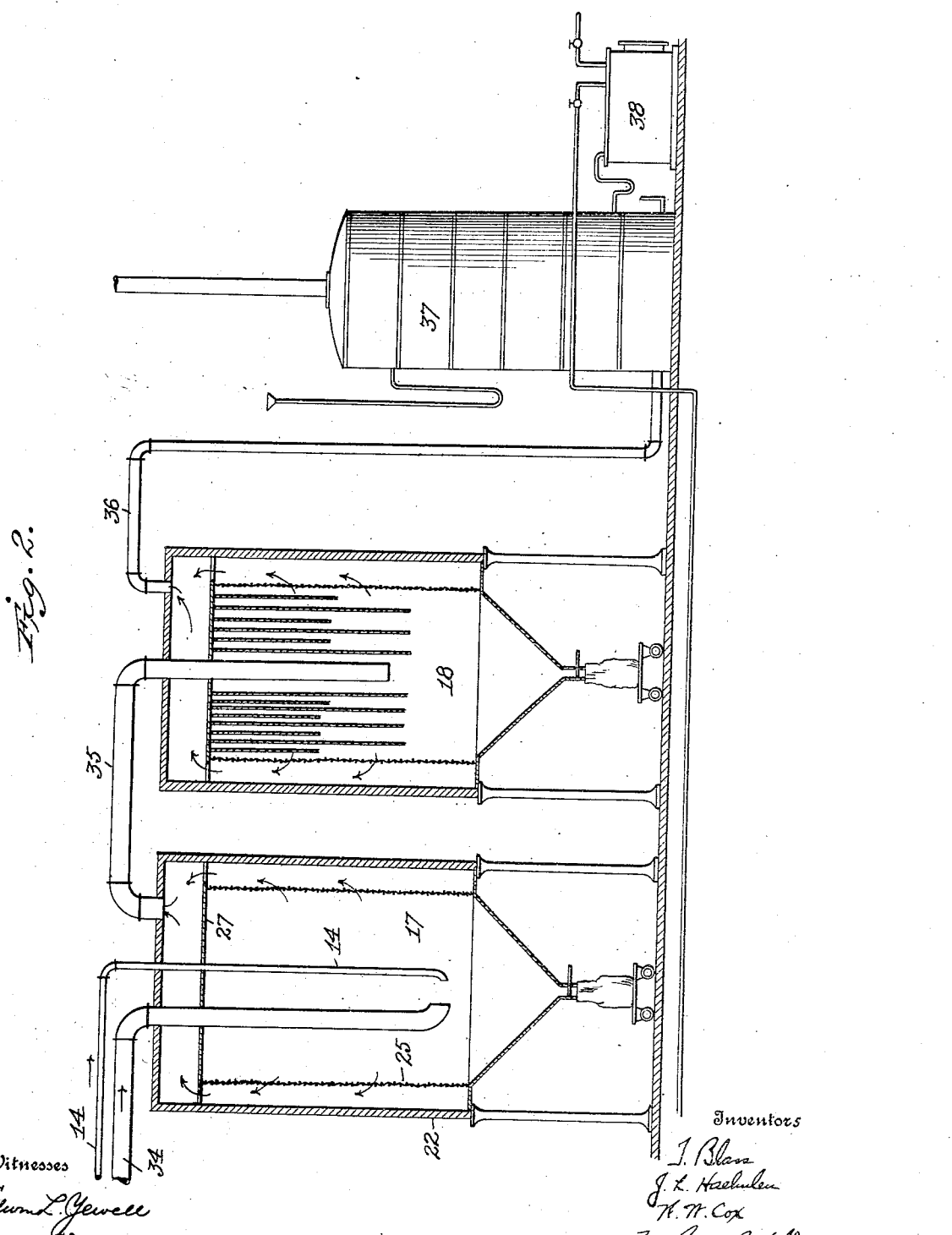

UNITED STATES PATENT OFFICE.

TALMADGE BLASS, OF WEST SENECA, NEW YORK, AND JACOB LUTHER HAEHNLEN AND WALTER WETHERILL COX, OF LEBANON, PENNSYLVANIA.

METHOD OF PRODUCING SALTS OF VOLATILE BASES.

No. 854,453.   Specification of Letters Patent.   Patented May 21, 1907.

Application filed July 14, 1906. Serial No. 326,281.

*To all whom it may concern:*

Be it known that we, TALMADGE BLASS, residing at West Seneca, in the county of Erie, State of New York, and JACOB LUTHER HAEHNLEN and WALTER WETHERILL COX, residing at Lebanon, in the county of Lebanon, State of Pennsylvania, all citizens of the United States, have invented new and useful Improvements in Methods of Producing Salts, of which the following is a specification.

Our invention relates to the manufacture of substantially pure salts, or what is known as "commercially pure" salts, by the union of a volatile base with an acid radical, both being led in the gaseous state into a suitable vessel where the base and acid radical combine and are deposited in a powder as a salt; and our invention more particularly relates to the formation of ammonium sulfite and ammonium carbamate from furnace gases, as will be hereinafter more particularly described and claimed.

Referring to the drawings, in which like parts are similarly designated: Figure 1 is an elevation, partly in section, of part of an apparatus designed to carry out our invention, and Fig. 2 is a like view forming a continuation of Fig. 1.

By a "volatile base" we wish to be understood to include any base like ammonium, such as lead, zinc, and the like, which, when brought to a suitable temperature, will form a vapor or gas.

We have illustrated an apparatus suitable for carrying out our process, most of the parts of which are of well known construction, and particularly designed for the distillation of ammonia and the formation of ammonium salts.

In the said drawings the reference numeral 2 denotes a storage tank for ammonia or ammonia liquor, such as is produced in the coking of coal. From this tank there is a pipe 3 having a cut-off valve 4 extending over two elements of the plant, one of which is a pre-heater 5, and the other a still 6. By closing the valve 4 the liquor is delivered to the pre-heater, where it is heated to about 99° centigrade (said pre-heater being of the type described in German patent to Solvay & Co., No. 49,500, dated November 4, 1888). The ammonia liquor is here freed from some of the sulfureted hydrogen, carbon dioxid and pyridene.

From the pre-heater the liquor is pumped by a centrifugal pump 7 to the still 6, where a certain quantity of ammonia liquor direct from tank 2 may or may not be united with it, as the exigencies of the operation and character of the product may require or demand. The still 6 may be of any desired construction, and I have shown the well known Feldman still. Ammonium gas is delivered from this still to a washer 8, also of well known construction, and is here freed from impurities, such as hydrogen sulfid, $H_2S$, pyridene, cyanogen, etc. The still 6 is connected to washer 8 by pipe 9, and the ammonia gases are led from washer 8 by pipe 10 and pipe 14 to the combining chambers 15, 16, 17 and 18. Pipe 10 is provided with a cut-off valve 11, and there is a by-pass 12 provided with a valve 13, by means of which the gas may be delivered directly from the still 6 to pipe 14 and from thence to the combining chambers.

A drip-tank 19 is designed to receive the drip from the washer 8, and the same is provided with a pipe 20 extending nearly to the bottom of said tank at one end and entering the pre-heater 5 at its other end. The tank being closed, by supplying air pressure on the surface of the liquor therein, the drip liquor can be forced back into the pre-heater through pipe 20.

At 21 is shown an acid gas supply pipe, designed to conduct the acid gases resulting from the roasting of pyritic ores, these gases containing principally sulfur dioxid, $SO_2$, and carbon dioxid, $CO_2$ and sometimes some aqueous vapor. The said pipe 21 enters into the first combining chamber 15, which consists of an outer casing 22 of wood or other suitable material, having a conical bottom provided with a draw-valve 24, by which the contents may be discharged into barrels or bags. Within this chamber is a silk, muslin, or burlap wall 25, and between said wall and the side walls of the outer casing 22 is an annular space 26, by means of which residual gases may pass up over the top 27 of the first chamber into a connecting pipe 28 to be delivered to the next combining chamber 16. A branch pipe 29 leads from the ammonia line pipe 14 into the combining chamber 15, and ends substantially opposite the end of pipe 21.

The gases passing through pipe 28 are delivered to the combining chamber 16, which consists of an outer casing 30 and an inner casing 31 of burlap, muslin, or the like, having a solid top 32 from which is hung a number of ropes 33. The uncombined gases passing through the walls 31 and up between the annular space between 30 and 31 flow through pipe 34 into chamber 17, where a fresh supply of ammonia is delivered through the end of pipe 14. This chamber is of substantially the same construction as chamber 15, the uncombined gases passing out through pipe 35 into chamber 18, which is identical in structure with chamber 16, and finally through pipe 36 to the washer 37 designed to collect any uncombined ammonia. The ammonia liquor from the washer 37 is collected in tank 38 and forced by air pressure, or in any other suitable manner, either to the pre-heater 5 or to the still 6, as may be desired. The ammonia gases containing some aqueous vapor delivered from pipe 14 and branch pipe 29 into the combining chamber 15 meet the gases containing $SO_2$ and $CO_2$ as they issue from pipe 21, the volatile base, ammonia, combining with the acid radical $SO_2$ to form ammonium sulfite, as follows:

The remaining gases circulate through pipe 28 into the next adjacent chamber 16, where further union takes place between the two gases. The bulk of the residual gases now being $CO_2$ is delivered through pipe 34 into combining chamber 17, where they meet a fresh supply of ammonia gas through pipe 14, the same combining to form ammonium carbamate,

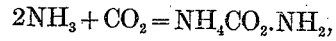

which is deposited in a fine powder, and may be subsequently converted into ammonium carbonate by treatment with superheated steam, or may be heated in retorts to decompose it into ammonium carbonate and urea by the following:

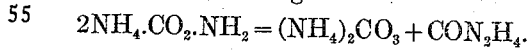

The ammonia in the combining chamber 17 combines with the carbon dioxid for the reason that there is no sulfur dioxid present, the greater affinity of the latter for the former preventing the formation of carbamate in the first two chambers.

It will thus be seen that we have produced a sulfite by the direct union of the gases, and have also produced a carbamate by the direct union of gases without the usual crystallization from liquors or solutions, and we thus obtain marketable products, without further treatment, direct from the gases resulting from the roasting of pyritic ores. In place of sulfurous acid gas, or the gas resulting from the roasting of pyritic ores, we may use hydrochloric acid gas to produce chlorids. We may use volatilizable metals, such as lead and zinc, and thereby produce either chlorids or sulfates, depending upon the acid radical introduced and intended to be combined.

Having thus described our invention, what we claim as new and desire to secure by Letters Patent is:

1. The method of producing salts, which comprises conducting sulfur dioxid and a suitable base in a gaseous state into a closed chamber in the presence of aqueous vapor in amount only sufficient to effect their union as a powdered salt.

2. The method of producing salts, which comprises conducting an acid gas and a base in a gaseous state into a closed chamber in the presence of aqueous vapor, said base and acid gas being capable of combining to form a plurality of salts, and depositing one of said salts in said chamber and depositing another of said salts in another chamber.

3. The method of producing salts, which comprises conducting an acid gas and a volatilized base into a closed chamber in the presence of aqueous vapor in amount only sufficient to cause the deposition of but one salt as a powder, and conducting the residual gases from said chamber for further treatment.

4. The method of producing salts, which comprises conducting an acid gas and a base in a gaseous state into a closed chamber in the presence of aqueous vapor sufficient to deposit a salt as a powder, and conducting the residual gases into another closed chamber and reacting upon them with the same base to deposit another and different salt as a powder.

5. The method of producing salts, which comprises reacting in a closed chamber upon gases resulting from the roasting of pyritic ores, with ammonia gas, in the presence of aqueous vapor in amount only sufficient to cause the deposition of ammonium sulfite as a powder.

6. The method of producing salts, which comprises reacting in a closed chamber upon gases resulting from the roasting of pyritic ores, with ammonia, in the presence of an aqueous vapor, to form ammonium sulfite, and reacting upon the residual gases containing carbon dioxid with ammonia to form ammonium carbamate.

7. The method of producing salts, which comprises reacting in a closed chamber upon gases resulting from the roasting of pyritic ores, with ammonia, in the presence of aqueous vapor, to deposit ammonium sulfite as a dry powder, then reacting in a closed chamber upon the residual gases containing carbon dioxid with ammonia gas to deposit ammonium carbamate as a dry powder.

In testimony whereof, we have hereunto set our hands in the presence of two subscribing witnesses.

TALMADGE BLASS.
JACOB LUTHER HAEHNLEN.
WALTER WETHERILL COX.

Witnesses for Talmadge Blass:
R. S. BRENNESHOLTZ,
F. H. BURNETT.

Witnesses for Jacob Luther Haehnlen and Walter Wetherill Cox:
EUGENE HOOSTER,
J. HENRY MILLER.